Nov. 6, 1923.
J. T. McGRATH
1,473,307
COMBINATION VEHICLE LAMP
Filed Aug. 19, 1921    2 Sheets-Sheet 1
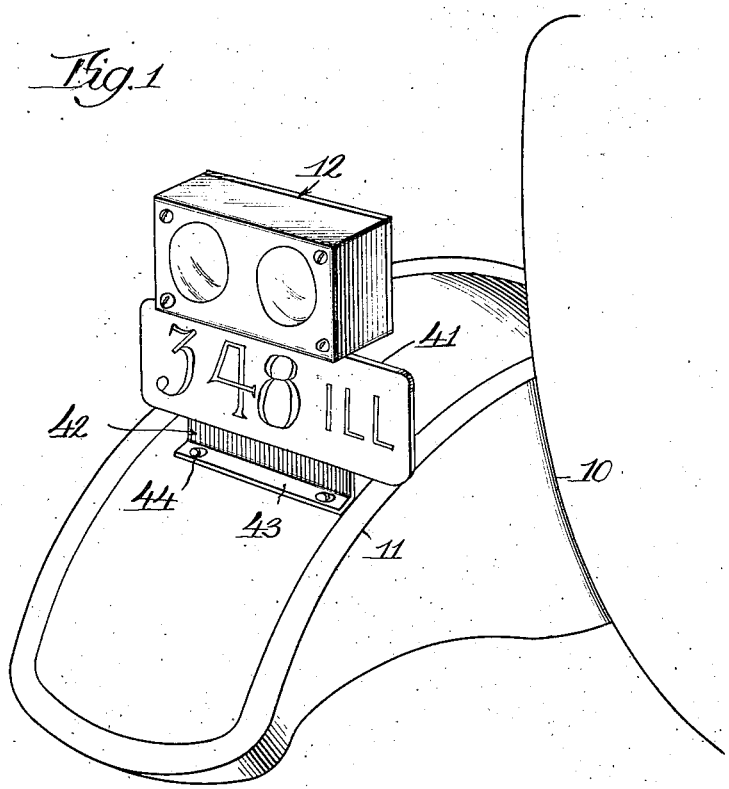
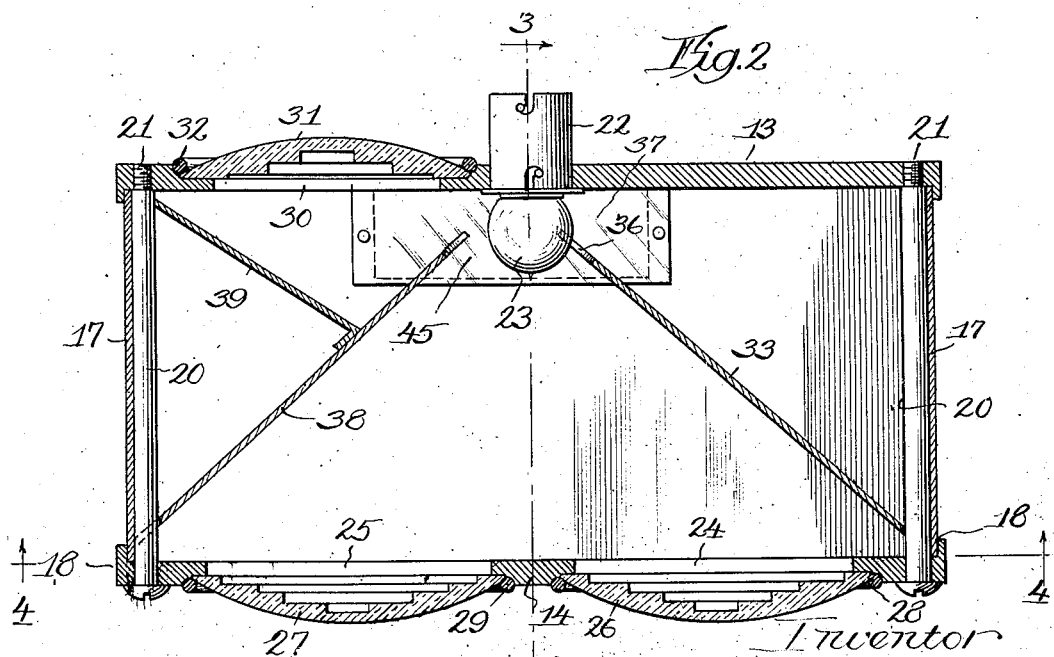

Nov. 6, 1923.                                            1,473,307
J. T. McGRATH
COMBINATION VEHICLE LAMP
Filed Aug. 19, 1921                    2 Sheets-Sheet 2.
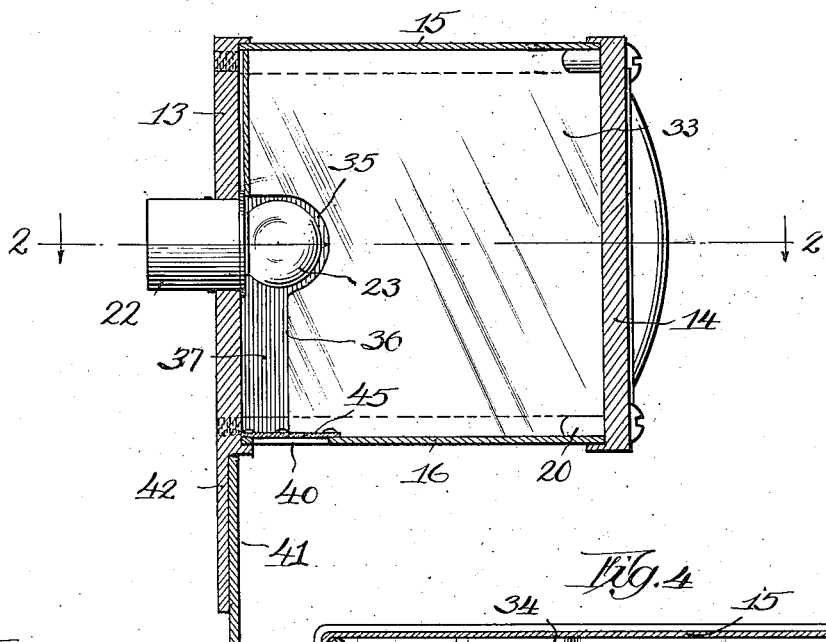
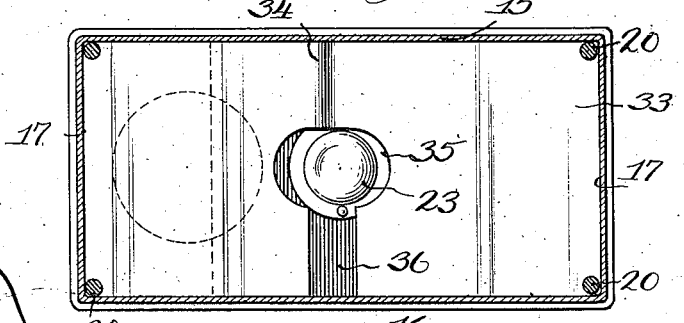
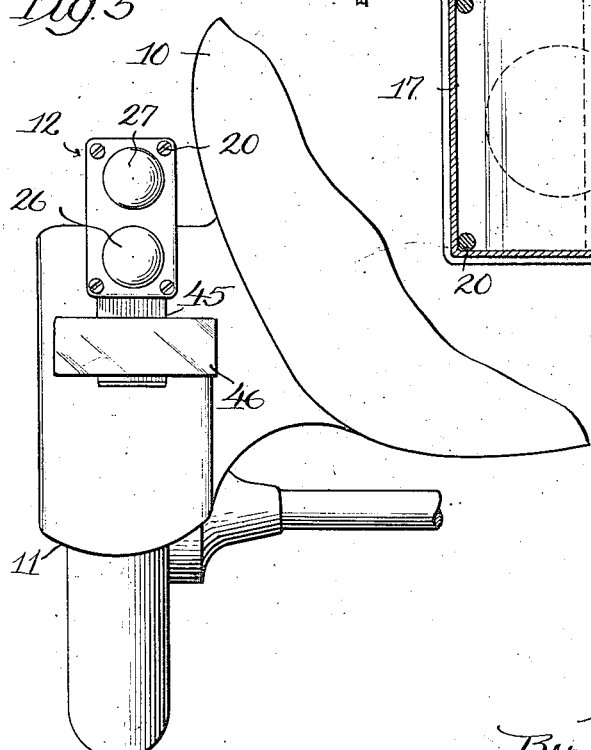
Inventor,
John T. McGrath,
By William L. Hala, Atty.

Patented Nov. 6, 1923.

1,473,307

UNITED STATES PATENT OFFICE.

JOHN THOMAS McGRATH, OF BLOOMINGTON, ILLINOIS.

COMBINATION VEHICLE LAMP.

Application filed August 19, 1921. Serial No. 493,523.

*To all whom it may concern:*

Be it known that I, JOHN T. McGRATH, a citizen of the United States, and a resident of Bloomington, in the county of McLean and State of Illinois, have invented certain new and useful Improvements in Combination Vehicle Lamps; and I do hereby declare that the following is a full, clear, and exact description thereof, reference being had to the accompanying drawings, and to the characters of reference marked thereon, which form a part of this specification.

This invention relates to a novel lamp for vehicles, and refers more specifically to a novel construction of such lamp, meaning thereby the entire lamp structure, to adapt the same as a combined, tail, parking, and spot lamp. The structure is adapted for these functions in connection with a source of light which may comprise the usual electric lamp bulb or a gas burner, and the arrangement of the structure is such as to enable the tail light functions to be effected both directly from the source of light and from an exterior source of light which enters the lamp casing and is reflected, to be thereafter transmitted through the colored lens of the tail light.

The lamp may also be so designed that the rays from the source of light can be transmitted through a suitable opening in the casing to illuminate an object supported in suitable relation to said opening, as, for instance, the license number tag of a motor vehicle.

An object of the invention is to provide a lamp structure adapted to these various functions, and a further object of the invention is to produce such a lamp structure that can be compactly and rigidly made.

In practice the lamp casing is preferably supported on the fender of the vehicle in a way to give ample side clearance at the side of the body for the forwardly directed parking light and to also suitably locate the lamp for the rear throw of the light rays through the tail light lens and through the rear spot light lens.

As shown in the drawings:

Figure 1 illustrates one manner in which my improved lamp may be attached to a motor vehicle.

Figure 2 is a horizontal section taken centrally through the lamp casing on the line 2—2 of Figure 3.

Figure 3 is a section on the line 3—3 of Figure 2, looking in the direction indicated by the arrows.

Figure 4 is a section on the line 4—4 of Figure 2, looking in the direction indicated by the arrows.

Figure 5 illustrates another manner of applying the lamp structure to a vehicle.

As shown in the drawings, 10 designates the general outline of the body of the vehicle, and 11 the fender thereof. 12 designates, as a whole, the lamp casing which, as most clearly shown in Figures 2, 3, and 4, embraces a front wall 13, a rear wall 14, top and bottom walls 15, 16, and end walls 17, 17. The front and rear walls 13, 14 may be made of relatively rugged material, such as cast plates, while the top, bottom, and end walls can be made of sheet metal suitably formed at their edges to engage confining flanges 18 at the margins of the front and rear walls and extending toward each other. The casing, as a whole, thus formed may be suitably fastened together by means of bolts 20 located at the corners of the casing, and which extend loosely through openings in the rear wall 14 and are reduced and threaded at their front ends 21 to engage threaded openings in the front plate 13, the front and rear walls being clamped upon the top, bottom, and end walls between the heads of said bolts and the screw threaded connections of the bolts with the rear casing wall. The said front wall is provided with an opening to receive a socket sleeve 22, which supports the base of an electric lamp 23, the connection between the base and the sleeve being the usual bayonet lock connection. A like bayonet lock connection may be made between the front end of said socket sleeve and the terminal plug of the conductor by which the lamp is connected to a source of current supply.

The rear wall 14 of the casing is provided with two openings 24, 25, located, one at each side of the center of the axis of the lamp 23 and symmetrical with respect to said axis. 26, 27 designate clear and tinted lenses, respectively, that are supported over said openings 24 and 25, with their edges seated in recesses in the rear faces of said rear wall. They are detachably fixed to the rear wall by means of expansion rings 28, 29 which engage over the margins of said lenses and interlock with the walls of said recesses.

The front wall 13 of the casing is provided with an opening 30 which is located at one side of the axis of the lamp 23 preferably on the side corresponding to the lens 27. Said opening 30 is covered by a clear lens 31 which is detachably fitted in a recessed part of the front wall across the opening 30 by means of an expansion ring 32.

33 designates a reflector within the casing that is located in rear of the clear lens 26 and diagonally with respect to the plane of the axis of said lens. Said reflector fills the vertical space between the top and bottom walls of the casing, as shown in Figures 3 and 4, and extends from near one end of the casing at its rear side at an angle of about forty-five degrees to a line near the transverse center of the front wall 13. The reflector may be fixedly attached in said casing in any suitable or preferred manner not necessary here to be shown. 38 designates a reflector also within the casing opposed to the reflector 33, it converging towards the reflector 33 from the corner of the casing adjacent to the lens 27 towards the lamp. The two reflectors 33, 38 may be made of a single piece or plate of material, folded along a transverse line 34, with the parts disposed at oblique angles near its center, as shown in Figure 4. As herein shown, the plate is cut at and beyond its angle to provide an elongated longitudinal opening 35 for the lamp bulb and which opens into a lower transverse slot 36, which extends to the lower edge of the plate at the sides of the angle line 34. The transverse cut 36 causes the reflector surface to terminate short of the front wall of the casing, so as to provide passages for direct lateral transmission of the lamp rays towards the ends of the casing for a purpose which will appear. Near the end of the casing adjacent to the reflector 38 is a second reflector 39 which is disposed partially opposite and in rear of the lens 31 and is obliquely opposite to said lens.

The bottom wall 16 of the casing is cut away near the front wall 13 thereof to produce an opening 40 in said bottom wall, downwardly through which the light rays from the lamp may be transmitted to illuminate an external object, such as the license plate 41. Said license plate may be horizontally supported, as shown in Figure 1, on a bracket 42 which is fixed to and extends downwardly from the front wall of the casing and is provided at its lower edge with a flange 43 shaped to conform to the curvature of the fender 11 and can be attached thereto by bolts 44. Preferably a transparent sheet or plate 45 is applied across the opening 40 to permit the light rays to be transmitted downwardly from the lamp through said opening over and across the license plate or tag 41, so as to illuminate the characters on said plate or tag and also to avoid the entrance of dust and dirt into the casing.

In practice, the front lens 31 may be a parking lens, forwardly through which light is transmitted from the casing to serve as a parking or signal lamp to be observed from the front of the car. The rays of the lamp 23 are transmitted through the parking lens 31 by reflection against the reflector 39 before referred to, located diagonally in rear of said lens 31 at a suitable angle to direct the rays of the lamp striking said reflector through said parking lens. The location of the lamp casing on the fender, as shown, gives sufficient sight clearance to the parking light to insure the visibility of the white light emitted through said lens.

In the structure shown the lens 26 is a clear lens and is herein termed the rear spot lens, through which the rays of the lamp 23 are directly transmitted to throw a shaft of light on the roadway in rear of the vehicle to guide the driver in backing the vehicle at night time.

The lens 27 is a tinted lens, a ruby tint being preferred. Light rays transmitted through said lens, either directly from the lamp 23 or from a dispersed or diffused body of light within the casing, constitute, in connection with said lens 27, a colored tail or signal light. When the lamp 23 is lighted it will be noted, from an inspection of Figure 2, that the rays therefrom pass, in part, directly through the tinted lens 27 to produce the tail light effect desired, other portions of the light of the lamp at the same time being directed through the parking lens 31 and the spot lens 26, as well also as through the opening 40, to illuminate the license tag.

Upon failure of the light 23, light rays which are transmitted through the clear lens 26 strike the reflector 33 and are thereby reflected against the reflector 38, whereby there is produced within the casing a dispersion or diffusion of a body of light in rear of the tinted lens to cause it to stand out as a tail light. A portion of the light thus transmitted into the casing through the rear clear lens 26 will be directed by mutual reflection of the reflectors 33 and 38 rearwardly through said tinted lens 27 to intensify the light of said tail light lens.

In Figure 1 the said lamp casing is shown as supported horizontally on the fender 11. In fender constructions where the rear end of the fender is low, the lamp casing 12 may be supported in vertical position on the fender 11 through the medium of a modified bracket 45 which is attached to the fender and which can also be designed to support a license tag or plate 46, as shown in Figure 5. With this construction it will be noted that the clear lens 26 is located at the bottom of the vertically arranged casing. The tinted lens 27 at the top of the rear of the casing, as well as the clear lens 31 at the front of the casing are located above the plane of the curvature of the fender, so that thereby both said lenses are in clear view from the rear and front, respectively, of the vehicle. When the casing, as shown in Figure 5, is used, the lower end wall can be provided with an opening, such as the opening 40, before referred to, to receive light rays from the lamp 23 that pass through the passage 37 and through the chamber below the reflector 33 and thence in rear of the license plate.

I claim:

1. A combination vehicle lamp comprising a casing provided with openings and with lenses thereover, one of which lenses is a tinted tail light lens, a source of light in the said casing, said lens covered openings being arranged to function, one as a forward throw parking lens, and the others as a rearward throw tail light lens and a rearward throw spot light lens, the means within said casing, whereby, when the point source of light fails, exterior light entering the lamp casing illuminates said tail light lens.

2. A combination vehicle lamp comprising a casing, said casing being provided with two rearward throw light openings, an illuminating lamp within the casing and forwardly of and in a plane between said rearward throw light openings, a tinted lens covering one of said rearward throw light openings, a clear lens covering the other opening, and reflectors within the casing diverging from said lamp obliquely in rear of said rearward throw light openings.

3. A combination vehicle lamp comprising a casing, a source of light therein, the front wall of said casing being provided with a forward throw light opening and the rear wall with two rearward throw light openings, a tinted lens covering one of said rearward throw light openings, and clear lenses covering said other openings, the bottom wall of the casing walls having a light opening adapted to direct light rays upon a license tag supported in fixed relation below the lamp casing.

4. A combination vehicle lamp comprising a casing, a source of light therein, said casing being provided with a forward throw light opening and two rearward throw light openings, a tinted lens covering one of said rearward throw light openings, clear lenses covering said other openings, and means whereby light entering through the lens of one of the rearward throw light openings is deflected through the tinted lens of the other rearward throw light opening to illuminate the latter lens when the source of light fails.

5. A combination vehicle lamp comprising a casing, a source of light therein, said casing having a forward throw light opening and two side by side rearward throw light openings, said openings being covered by lenses, one of the rear lenses being tinted, and reflectors within the casing located with respect to each other and the rearward throw openings so that light entering the casing through the rear clear lenses is caused to illuminate the tinted lens.

6. A combination vehicle lamp comprising a casing, a source of light therein, said casing having a forward throw light opening and two side by side rearward throw light openings, said openings being covered by lenses, one of the rear lenses being tinted, reflectors within the casing located with respect to each other and the rearward throw openings so that light entering the casing through the rear clear lenses is caused to illuminate the tinted lens, and another reflector within the casing located to receive light rays from the source of light and to reflect them forwardly through the lens of the forward throw light opening.

7. A combination lamp comprising a casing having therein a source of light, said casing being provided with two rearward throw light openings located side by side, one covered by a tinted lens to constitute a tail light, the other covered by a clear lens to constitute a rear spot light, and means within the casing to disperse light entering the casing through the clear lens to illuminate the tinted lens.

8. A lamp casing having in its front wall a forward throw light opening and in its rear wall sidewise disposed rearward throw light openings, with lenses covering said openings, a source of light at the forward wall at the side of the forward throw light opening and between the rearward throw light openings, an oblique reflector in rear of said forward throw light opening and exposed to said light source, and mutually reflecting reflectors obliquely in rear of said rearward throw light openings and converging towards and extending abreast said light source.

In witness whereof I claim the foregoing as my invention, I hereunto append my signature this 27 day of July, 1921.

JOHN THOMAS McGRATH.